United States Patent
Sadasue et al.

(10) Patent No.: US 9,268,577 B2
(45) Date of Patent: Feb. 23, 2016

(54) INFORMATION PROCESSING APPARATUS

(71) Applicants: Tamon Sadasue, Kanagawa (JP); Satoshi Mori, Tokyo (JP); Naoya Ohashi, Kanagawa (JP); Satoshi Aoki, Kanagawa (JP); Naoya Morita, Kanagawa (JP)

(72) Inventors: Tamon Sadasue, Kanagawa (JP); Satoshi Mori, Tokyo (JP); Naoya Ohashi, Kanagawa (JP); Satoshi Aoki, Kanagawa (JP); Naoya Morita, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 239 days.

(21) Appl. No.: 13/973,046

(22) Filed: Aug. 22, 2013

(65) Prior Publication Data
US 2014/0075176 A1    Mar. 13, 2014

(30) Foreign Application Priority Data
Sep. 13, 2012  (JP) ................................ 2012-201142

(51) Int. Cl.
G06F 9/44     (2006.01)
G06F 12/02    (2006.01)

(52) U.S. Cl.
CPC ............ *G06F 9/4401* (2013.01); *G06F 9/4421* (2013.01); *G06F 12/0284* (2013.01)

(58) Field of Classification Search
CPC .. G06F 9/4401; G06F 9/4421; G06F 12/0284
See application file for complete search history.

(56) References Cited

U.S. PATENT DOCUMENTS

| | | | | |
|---|---|---|---|---|
| 4,736,290 A | * | 4/1988 | McCallion | 711/202 |
| 6,356,942 B1 | * | 3/2002 | Bengtsson et al. | 709/220 |
| 8,122,379 B2 | | 2/2012 | Sakuyama et al. | |
| 8,239,667 B2 | * | 8/2012 | Durham | 713/100 |
| 8,463,950 B2 | | 6/2013 | Yoshida | |
| 8,843,733 B2 | * | 9/2014 | Durham | 713/100 |
| 2002/0054573 A1 | * | 5/2002 | Bengtsson et al. | 370/254 |
| 2005/0083761 A1 | * | 4/2005 | Ginosar | 365/222 |
| 2005/0278712 A1 | * | 12/2005 | Buskens et al. | 717/148 |
| 2006/0265579 A1 | * | 11/2006 | Seol | 713/1 |
| 2008/0052506 A1 | * | 2/2008 | Iima et al. | 713/1 |
| 2008/0126784 A1 | * | 5/2008 | Iima et al. | 713/2 |
| 2009/0119583 A1 | | 5/2009 | Kihara et al. | |
| 2013/0250336 A1 | * | 9/2013 | Takatani | 358/1.13 |

FOREIGN PATENT DOCUMENTS

| | | |
|---|---|---|
| JP | 2009-301319 | 12/2009 |
| JP | 2010-146142 | 7/2010 |
| JP | 2012-059024 | 3/2012 |

OTHER PUBLICATIONS

U.S. Appl. No. 13/782,347, filed Mar. 1, 2013.

* cited by examiner

*Primary Examiner* — M Elamin
(74) *Attorney, Agent, or Firm* — Harness, Dickey & Pierce, P.L.C.

(57) ABSTRACT

An information processing apparatus includes a processor that executes an instruction stored in a fixed address area in a storage part; the storage part that stores a first startup program and a second startup program, contents of the second startup program being different at least partially from those of the first startup program; and an address conversion part that, when the processor carries out a predetermined startup different from an ordinary startup that is carried out at a time of starting power supply to the information processing apparatus, converts an address included in a read instruction issued by the processor indicating a storage area that stores the first startup program into an address indicating an other storage area that stores the second startup program, and sends the converted address to the storage part.

9 Claims, 17 Drawing Sheets

INFORMATION PROCESSING APPARATUS

BACKGROUND OF THE INVENTION

1. Field of the Invention

The present invention relates to an information processing apparatus.

2. Description of the Related Art

Various manners have been used concerning a process of starting up an information processing apparatus. For example, Japanese Laid-Open Patent Application No. 2010-146142 discusses an information processing apparatus. The information processing apparatus includes first and second processors. The second processor carries out a preparation process for the first processor to be able to read a group of instructions concerning a program from a first memory and execute them. Temporally in parallel with the preparation process carried out by the second processor, the first processor reads a group of instructions concerning the program from a second memory other than the first memory, and executes them. Then, in response to the completion of the preparation process, the memory for obtaining the group of instructions therefrom is switched from the second memory to the first memory. Thus, the program is continuously executed.

SUMMARY OF THE INVENTION

According to one embodiment of the present invention, an information processing apparatus includes a processor that executes an instruction stored in a fixed address area in a storage part; the storage part that stores a first startup program and a second startup program, contents of the second startup program being different at least partially from those of the first startup program; and an address conversion part that, when the processor carries out a predetermined startup different from an ordinary startup that is carried out at a time of starting the power supply to the information processing apparatus, converts an address included in a read instruction issued by the processor indicating a storage area that stores the first startup program into an address indicating an other storage area that stores the second startup program, and sends the converted address to the storage part.

Other objects, features and advantages of the present invention will become more apparent from the following detailed description when read in conjunction with the accompanying drawings.

DETAILED DESCRIPTION OF THE EMBODIMENTS

According to the above-described information processing apparatus discussed in Japanese Laid-Open Patent Application No. 2010-146142, there is only one type of startup processing concerning hardware. Therefore, when a predetermined startup (for example, a restart carried out in a state of the power supply being maintained), which is different from an ordinary startup carried out at a time of starting the power supply, is to be carried out concerning hardware, all of the sequences of startup processes including initialization of a peripheral module, a process of verifying a startup program and so forth are to be carried out. Therefore, the startup time required for carrying out the predetermined startup different from the ordinary startup may be longer.

Below, information processing apparatuses according to embodiments of the present invention will be described using drawings.

It is noted that, hereinafter, an "address zero" is one example of the start address of a "fixed address area". In a case where a processor is used which executes an instruction from a fixed address other than the "address zero", the "address zero" is to be read as the "fixed address"

First Embodiment

Configuration

Figure 1:
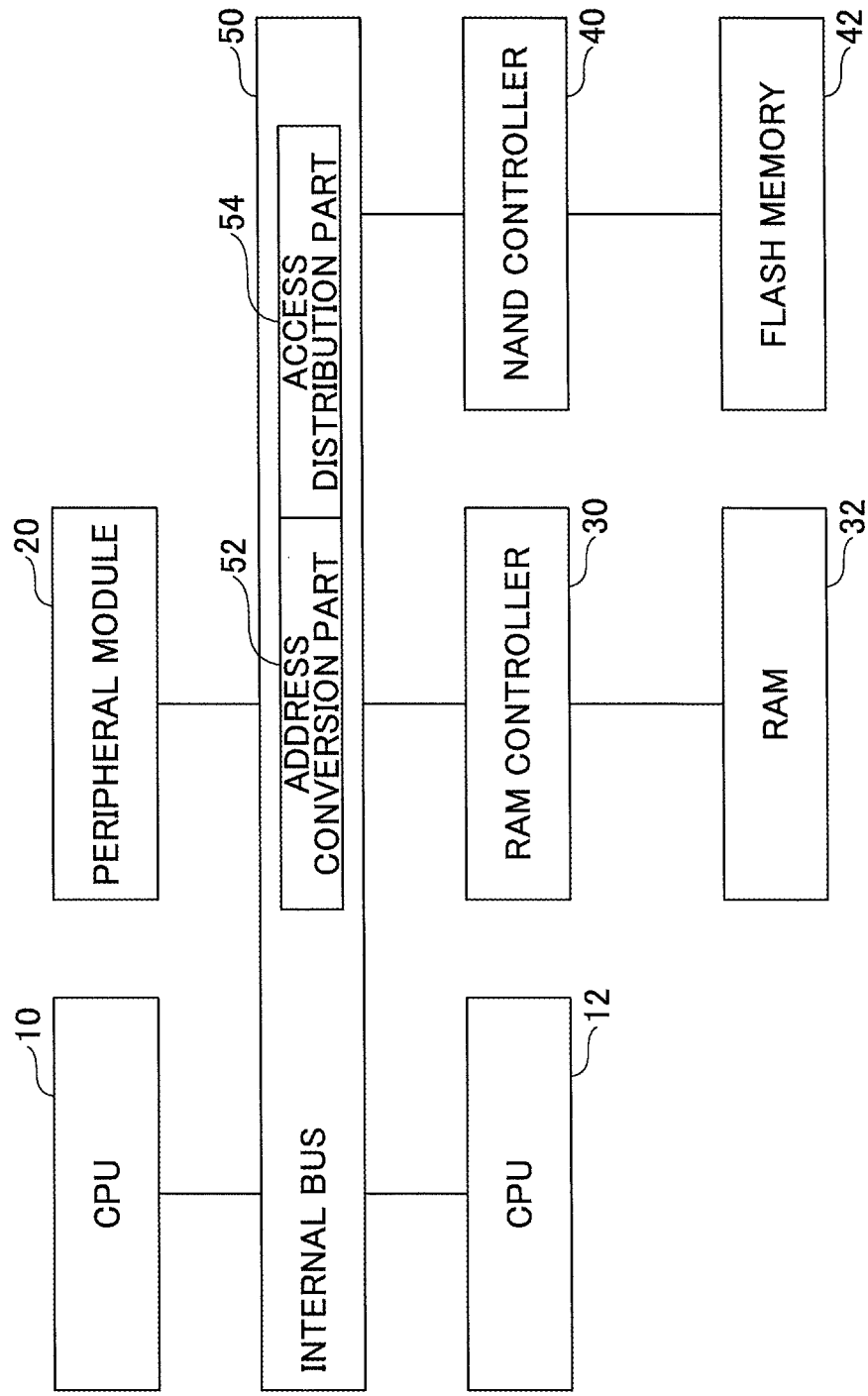
FIG. 1 shows a hardware configuration example of an information processing apparatus according to a first embodiment.

FIG. 1 shows a hardware configuration example of an information processing apparatus 1 according to a first embodiment. The information processing apparatus 1 includes, for example, a Central Processing Unit (CPU) 10, a CPU 12, a peripheral module 20, a Random Access Memory (RAM) controller 30, a RAM 32, a NAND controller 40 and a flash memory 42. These elements are connected by an internal bus 50. The internal bus 50 includes an address conversion part 52 and an access distribution part 54. The CPUs 10 and 12, the peripheral module 20, the RAM controller 30, the NAND controller 40 and the internal bus 50 are mounted on a single chip, and thus, are formed as a System On Chip (SOC).

The CPUs 10 and 12 are processors, and each thereof includes, for example, a control part, an instruction fetch unit, an instruction decoder, an instruction issuance part, various operational units, a Load Store Unit (LSU), a register file and/or the like. Respective Operating Systems (OSs) are installed in the CPUs 10 and 12, for example, and thus, the information processing apparatus 1 functions as a multi-OS information processing apparatus.

The CPU 10 is controlled to execute instructions stored in a fixed address area (for example, an area starting from the address zero) in the flash memory 42 at a time of a startup. On the other hand, the CPU 12 is controlled to execute instructions stored in an area designated by the CPU 10 in the RAM 32 or the flash memory 42 at a time of a startup. Thus, the CPU 10 operates as a master processor with respect to the CPU 12, and the CPU 12 operates as a slave processor with respect to the CPU 10.

The peripheral module 20 includes, for example, a communication interface for carrying out communication with an external device other than the RAM 32 and the flash memory 42 and/or a network such as an Ethernet (registered trademark); an image processing part generating a display image of a display device; a sound processing part generating a sound that a speaker outputs, and so forth.

The RAM 32 is a main storage for loading a program stored in the flash memory 42 and/or storing results of operations carried out by the CPUs 10 and 12.

The flash memory 42 is a program memory for storing programs that the CPUs 10 and 12 execute, and is a nonvolatile memory for storing data to be kept even after the power supply to the information processing apparatus 1 has been turned off. It is to be noted that it is also possible to use, instead of the flash memory 42, a nonvolatile memory of another type such as a Hard Disk Drive (HDD), a mask Read-Only Memory (ROM) or the like.

Figure 2:
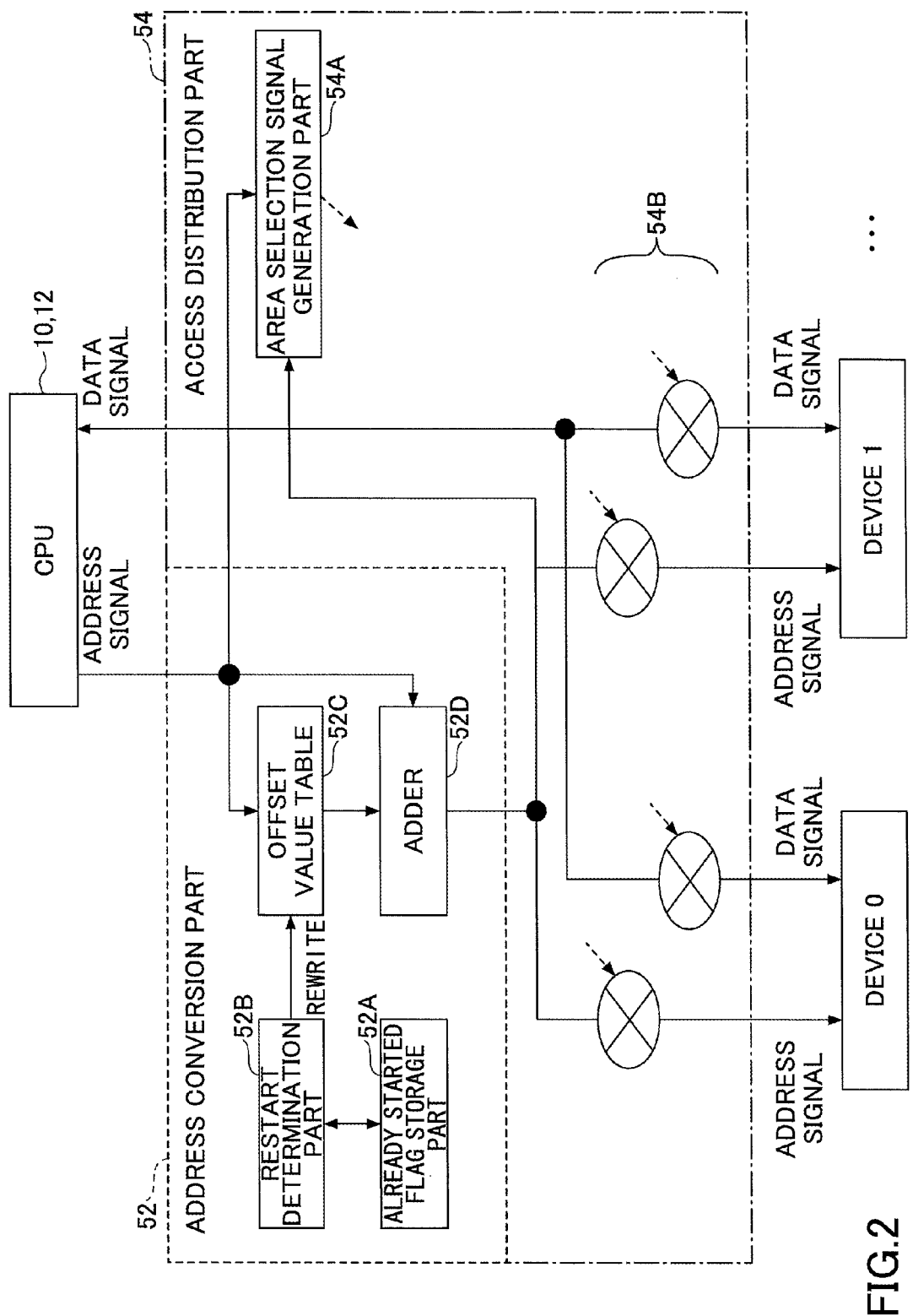
FIG. 2 shows configuration examples of an address conversion part and an access distribution part.

FIG. 2 shows configuration examples of the address conversion part 52 and the access distribution part 54.

The address conversion part 52 includes an already started flag storage part 52A, a restart determination part 52B, an offset value table 52C and an adder 52D.

The already started flag storage part 52B is, for example, a register. In the already started flag storage part 52B, a predetermined flag (for example, data indicating a value "1") is written by the restart determination part 52B, when the information processing apparatus 1 has carried out an ordinary startup.

The restart determination part 52B is, for example, a logic circuit, which writes the predetermined flag in the already started flag storage part 52A, rewrites the contents of the offset value table 52C, and so forth. The restart determination part 52B controls the offset value table 52C in such a manner that values to be stored in the offset value table 52C in a case where the predetermined flag has been written in the already started flag storage part 52A differ from those in a case where the predetermined flag has not been written in the already started flag storage part 52A.

In the offset value table 52C, amounts (offset values) are stored to increase the address values of address signals transmitted by the CPU 10 and the CPU 12 for, for example, all the memory areas including the RAM 32 and the flash memory 42. In the offset value table 52C, the value "zero" is stored for a memory area, from among the memory areas, for which the address values are not to be increased.

The adder 52D adds, to the address values of the address signals transmitted from the CPU 10 and the CPU 12, the offset values that correspond to the address values and are stored in the offset value table 52C, and outputs the addition results to various devices (for example, the RAM 32, the flash memory 42 and so forth).

With the above-described configuration, the address conversion part 52 can convert the address values of only the address signals concerning desired areas from among the address signals transmitted by the CPU 10 and the CPU 12, and output the thus obtained address signals to the various devices.

The access distribution part 54 includes an area selection signal generation part 54A and crossbar switches 54B. The address signals transmitted from the CPU 10 and the CPU 12 regard the plurality of devices as a single memory area. Therefore, the access distribution part 54 controls the crossbar switches 54B in such a manner that the crossbar switches 54B connect the CPU 10 or the CPU 12 with any device corresponding to the input address signal. Thus, the access distribution part 54 can connect the CPU 10 or the CPU 12, which is the access originator, with only the specific device.

Figure 3:
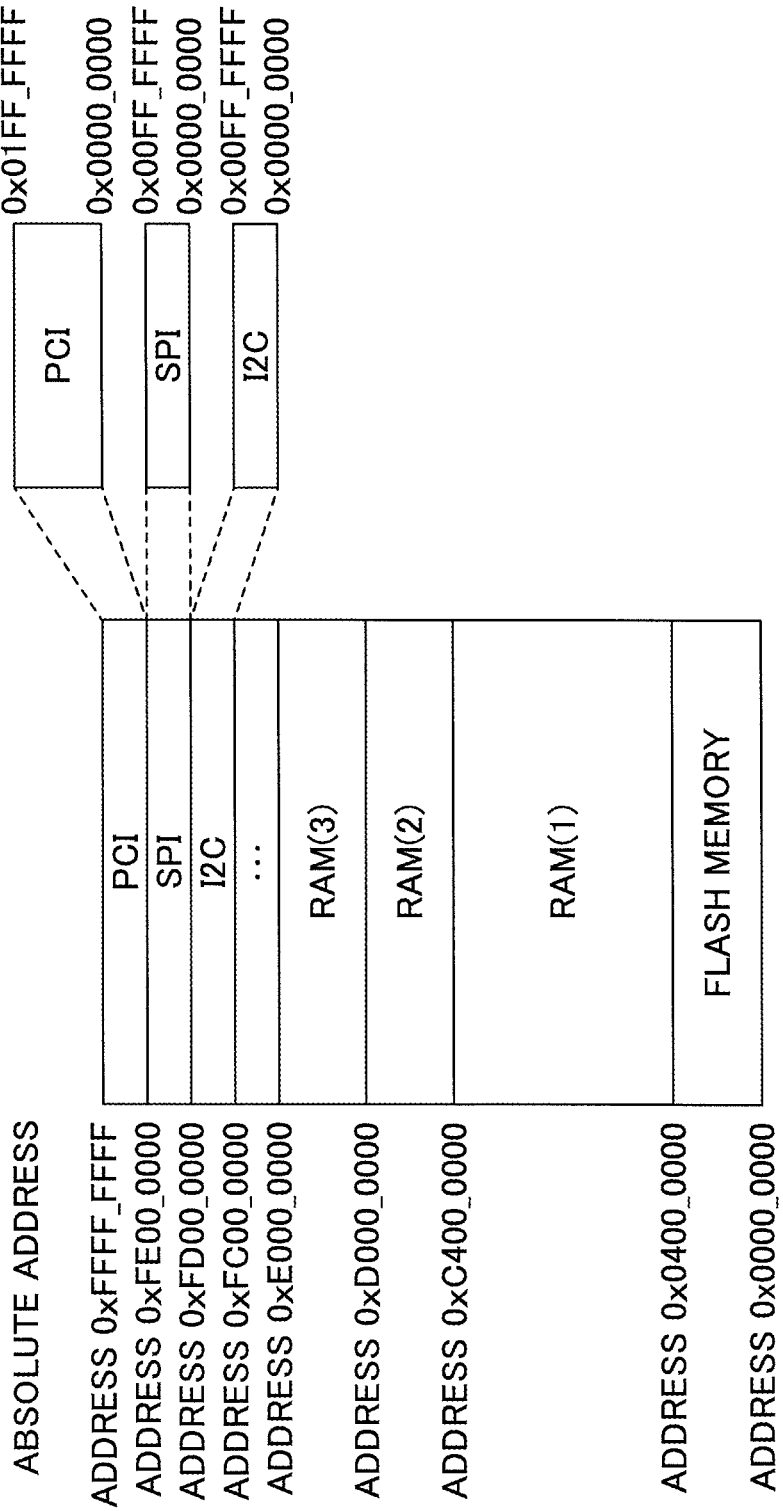
FIG. 3 shows one example of a memory map in the information processing apparatus shown in FIG. 1.

FIG. 3 shows one example of a memory map in the information processing apparatus 1. The memory map shows correspondence relationship between the addresses seen by the CPUs 10 and 12 and the addresses of the respective devices. The addresses seen by the CPUs 10 and 12 are those obtained as a result of virtual addresses that an application program or the like recognizes as being converted into absolute addresses by a Memory Management Unit (MMU) or the like.

As shown in FIG. 3, the CPUs 10 and 12 allocate the addresses also to buses and communication interfaces and so forth such as a Peripheral Component Interconnect (PCI), a Serial Peripheral Interface (SPI), Inter-Integrated Circuit (I2C) and so forth, in addition to the RAM 32 and the flash memory 42. The "converted relative address" shown in FIG. 3 is the internal address that each device recognizes. It is noted that RAM(1), RAM(2) and RAM(3) in the memory map shown in FIG. 3 may indicate respective physical RAMs in a case where the RAM 32 includes a collection of a plurality of physical RAMs, or respective areas in a case where the single physical RAM is divided for convenience into the respective areas.

[Operations at Time of Starting Power Supply]

Figure 4:
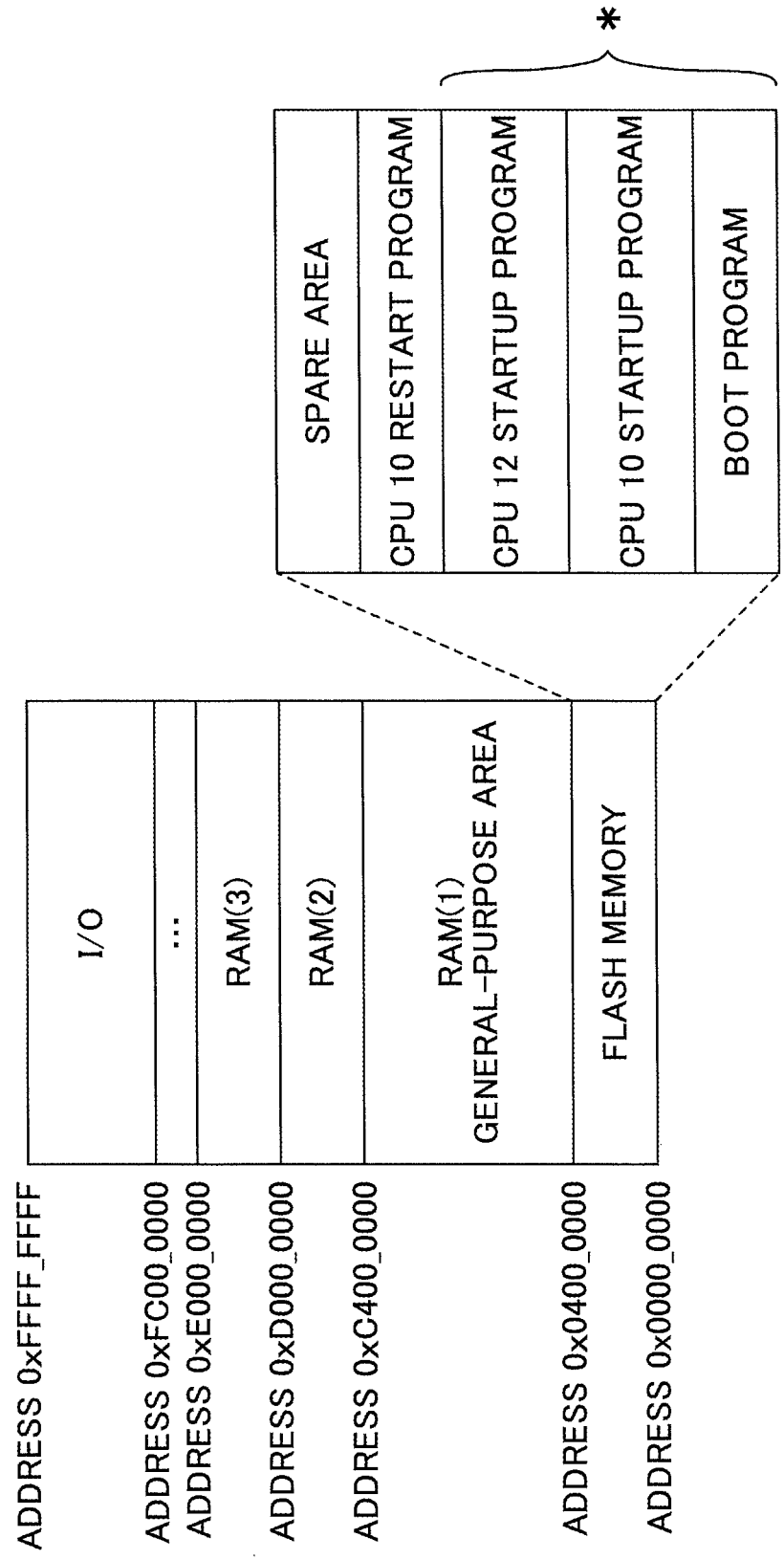
FIG. 4 shows one example of a memory map in the information processing apparatus shown in FIG. 1 at a time of ordinarily starting the power supply.

FIG. 4 illustrates a memory map at a time of ordinarily starting the power supply to the information processing apparatus 1. As shown in FIG. 4, a boot program, a CPU 10 startup program, a CPU 12 startup program and so forth are stored in the flash memory 42, and the CPU 10 is controlled in such a manner that, first the CPU 10 is to execute the boot program.

The above-mentioned "ordinarily starting the power supply" means a concept excluding starting the power supply to the CPU 10 for returning from a power saving mode as will be described for a third embodiment. As will be described later for the third embodiment, the power supply to the CPU 12 is maintained while the power supply to the CPU 10 is not carried out during the power saving mode. Therefore, in the description, starting the power supply from a state of the power supply having been turned off in the entire information processing apparatus 1 is referred to as "ordinarily starting the power supply", and is distinguished from a case of returning from the power saving mode. Further, a startup to be carried out at a time of ordinarily starting the power supply is referred to as an "ordinary startup".

Figure 5:
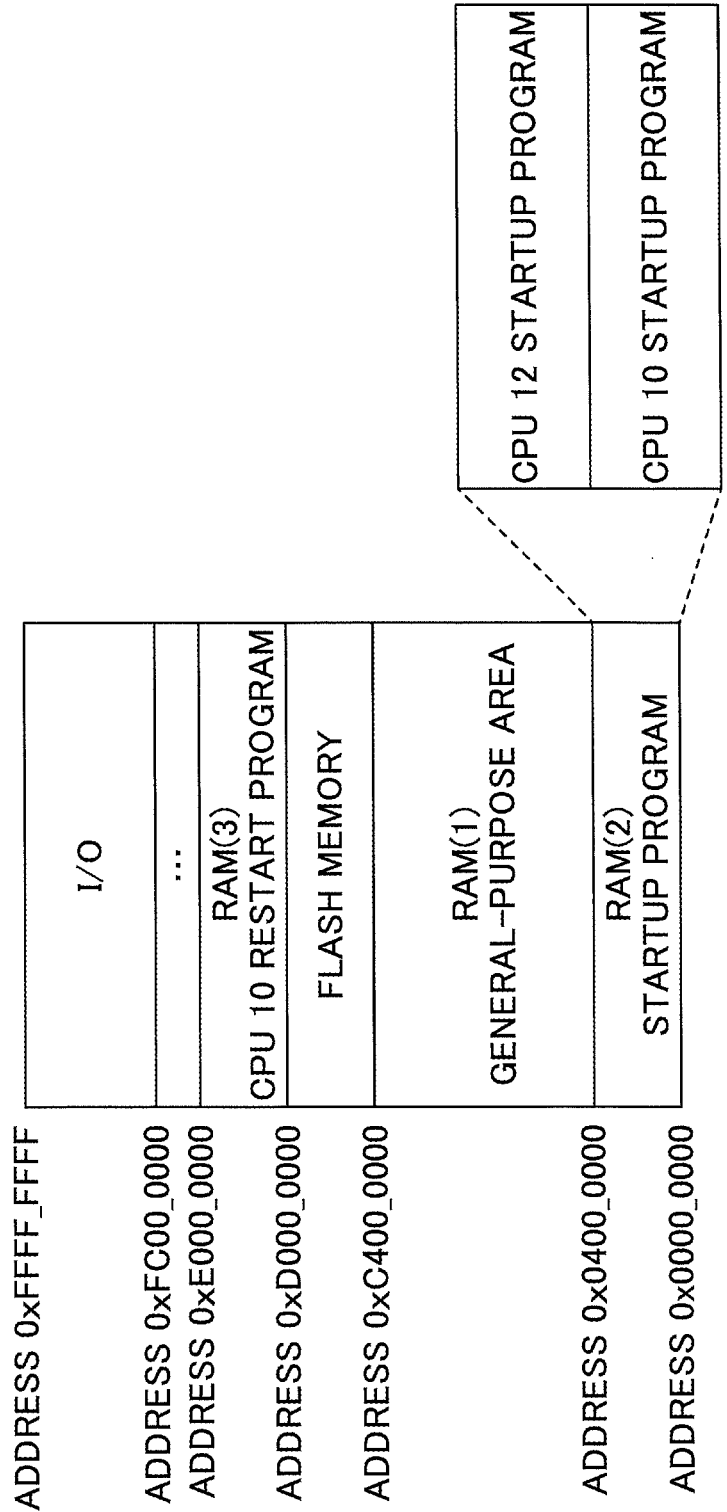
FIG. 5 shows one example of a memory map in the information processing apparatus shown in FIG. 1 after a time has elapsed from the ordinarily starting the power supply and a boot program has been executed.

FIG. 5 illustrates a memory map after a period of time has elapsed from ordinarily starting the power supply and the boot program has been executed. When the boot program has been executed, the CPU 10 startup program and the CPU 12 startup program stored in the flash memory 42 are copied to the RAM 32. The CPU 10 itself may carry out this copying process, or may send an instruction to a DMA controller (not shown) and cause it to carry out the copying process.

After the completion of the copying process, the address conversion part 52 and the access distribution part 54 control the offset value table 52C and the crossbar switches 54B. Thereby, the access target of the CPU 10 is switched from the flash memory 42 to the RAM(2). After that, the state of the CPU 10 is switched into a state of executing the programs stored in the RAM 32 instead of the flash memory 42. Thereby, the CPU 10 can carry out a startup at a higher speed than executing the programs stored as they are in the flash memory 42. Further, from the CPU 10, this state is seen the same as the state of executing the programs stored as they are in the flash memory 42. Therefore, it is not necessary to add special operations for switching the access target or the like to the startup program.

Further, in parallel with these operations (or, before or after thereof), a CPU 10 restart program stored in the flash memory 42 is copied to the RAM(3).

Figure 6:
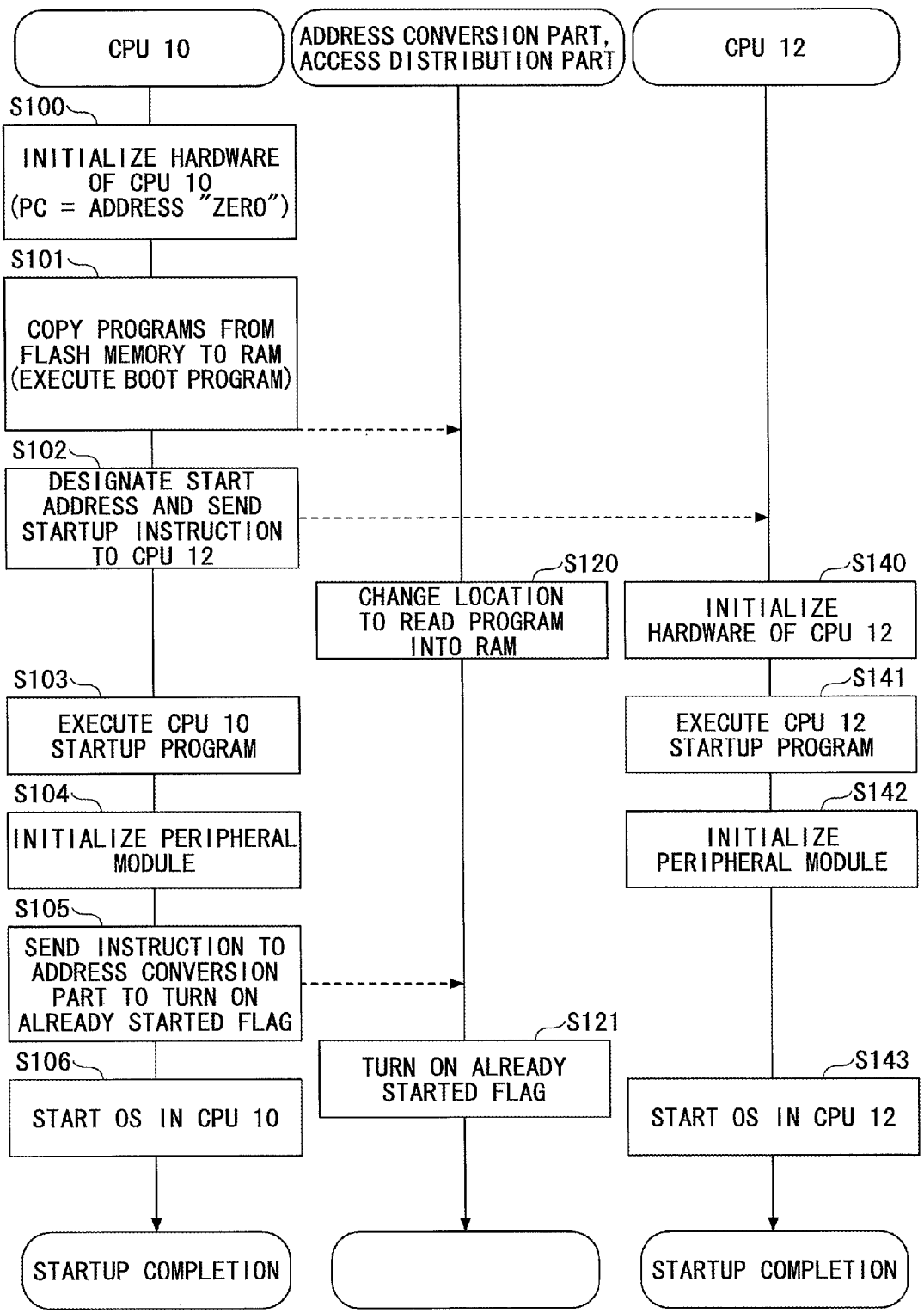
FIG. 6 is a flowchart showing one example of a flow of processes carried out by a CPU 10, the address conversion part, the access distribution part and a CPU 12 at a time of an ordinary startup.

FIG. 6 is a flowchart showing one example of a flow of processes carried out by the CPU 10, the address conversion part 52, the access distribution part 54 and the CPU 12 at a time of an ordinary startup. It is to be noted that, in the flowchart shown in FIG. 6, the orders of steps carried out in parallel are not particularly limited. For example, step S140 may be carried out temporally after step S103.

First, the CPU 10 initializes the hardware of the CPU 10 (step S100). Specifically, the CPU 10 initializes the operating frequency and a cache capacity, and causes storage elements inside the CPU 10 such as a program counter, a register and so forth to have their original states. Thereby, the program counter value is set to indicate, for example, the address zero.

Next, the CPU 10 executes the boot program stored in the flash memory 42, and thereby, the CPU 10 startup program and the CPU 12 startup program are copied to the RAM 32 (in step S101, see FIGS. 4 and 5). After the execution of the boot program is completed, a signal indicating this matter is transmitted to the address conversion part 52.

Figure 7:
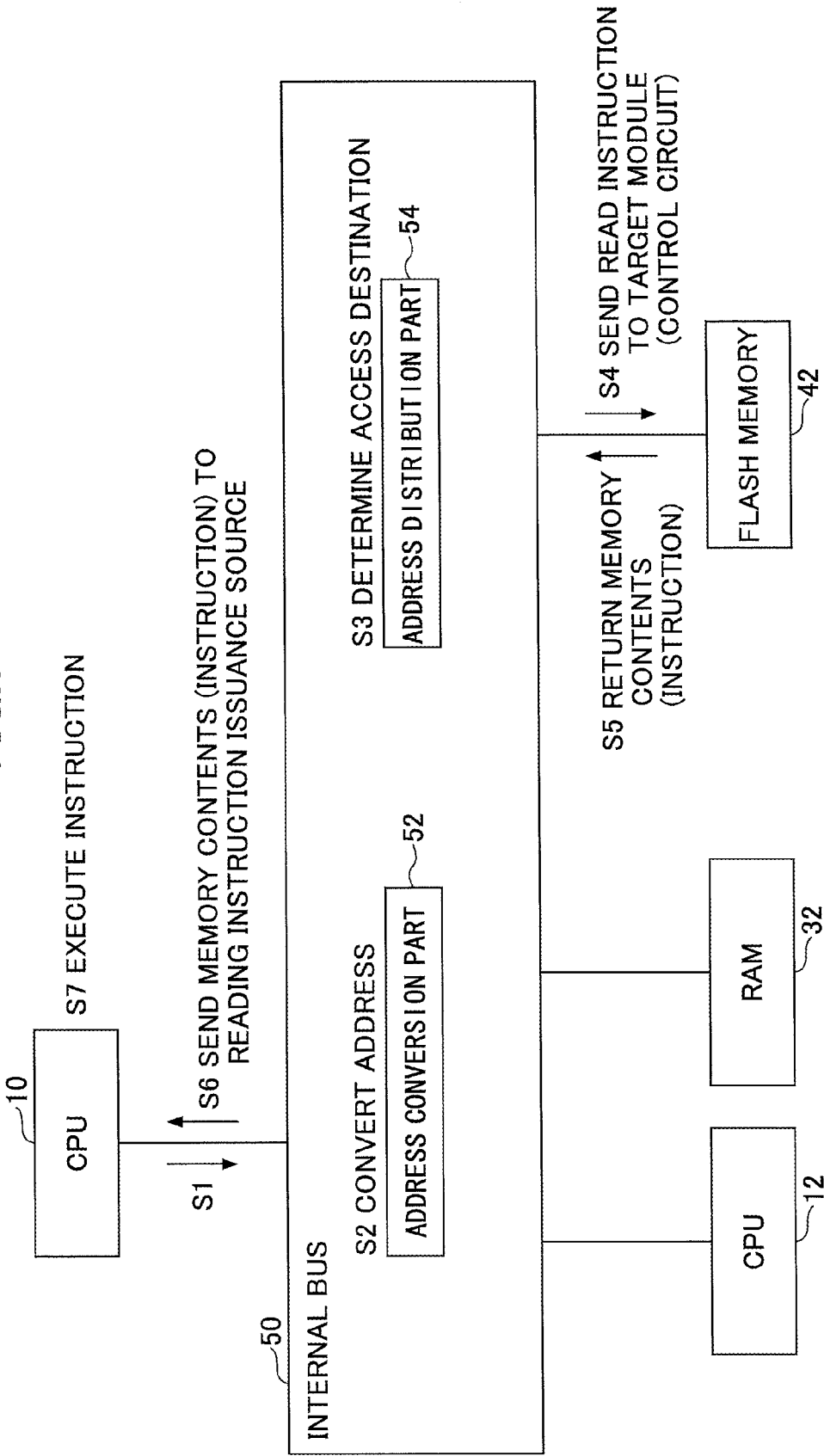
FIG. 7 shows a state of a read instruction being sent from the CPU 10 to a flash memory and the instruction stored in the flash memory being returned to the CPU 10.

FIG. 7 shows a manner of sending a read instruction from the CPU 10 to the flash memory 42 and returning an instruction stored in the flash memory 42 to the CPU 10. In FIG. 7, when the CPU 10 has issued a read instruction for the address zero to the internal bus 50 (step S1), the address conversion part 52 inside the circuit of the internal bus 50 converts the address (step S2), further determines the access destination (step S3), and outputs the read instruction to the address indicated by the address zero (step S4). A control circuit in the flash memory 42 returns the instruction stored at the address concerning the read instruction to the internal bus 50 (step S5), and the internal bus 50 sends the given instruction to the CPU 10 (step S6). Thus, the CPU 10 executes the instruction stored at the address corresponding to the address zero (step S7). Since the program includes continuous data (successive instructions), the above-mentioned steps S1, S2, . . . and S7 are repeated accordingly. Thus, the CPU 10 can read the instructions from the flash memory 42 and execute them in sequence.

Next, the CPU 10 designates a start address and sends a startup instruction to the CPU 12 (step S102). For example, the start address is an address in the RAM 32 at which the CPU 12 startup program has been copied (i.e., the beginning address of the area that stores the CPU 12 startup program in the RAM(2) area shown in FIG. 5).

Next, the address conversion part 52 and the access distribution part 54 change the reading target, from which the CPU 10 reads the program, to an address in the RAM 32 (i.e., the beginning address of the area that stores the CPU 10 startup program in the RAM(2) area shown in FIG. 5) (step S120).

Next, the CPU 12 initializes the hardware of the CPU 12 (step S140).

Then, the CPU 10 executes the CPU 10 startup program stored in the RAM 32 (step S103), and the CPU 12 executes the CPU 12 startup program stored in the RAM 32 (step S141). The respective startup programs include, for example, instructions for starting the Basic Input/Output Systems (BIOSs), for example.

Next, the CPU 10 and the CPU 12 initialize the peripheral module 20 (step S104 and S142). The peripheral module 20 includes a timer(s), a debugger(s) and so forth, and the respective CPUs 10 and 12 cause the internal states thereof to be the original states.

Next, the CPU 10 sends an instruction to the address conversion part 52 to turn on an already started flag (step S105). The address conversion part 52 responds to the instruction and the restart determination part 52B therein turns on the predetermined flag in the already started flag storage part 52A (step S121).

Next, the CPU 10 and the CPU 12 start the respective OSs (steps S106 and S143), and thus, the ordinary startup is completed. It is noted that the OSs are stored, for example, in the RAM(1) shown in FIGS. 4 and 5.

[Operations at Time of Restart]

There is a case where the information processing apparatus 1 according to the first embodiment carries out a predetermined startup different from an ordinary startup that is carried out at a time of ordinarily starting the power supply. Predetermined startups are carried out, for example, at a time of a restart, at a time of returning from the power saving mode, and so forth, for example, respectively. Returning from the power saving mode will be described in the description for the third embodiment described later. Only a restart will be described in description for the first embodiment. A restart means resetting the contents stored in the internal register(s) and/or the like in the CPU 10 and executing a program from the beginning again when unpredictable operations have been carried out by the CPU 10 or the program enters a state of not responding, for example.

Figure 8:
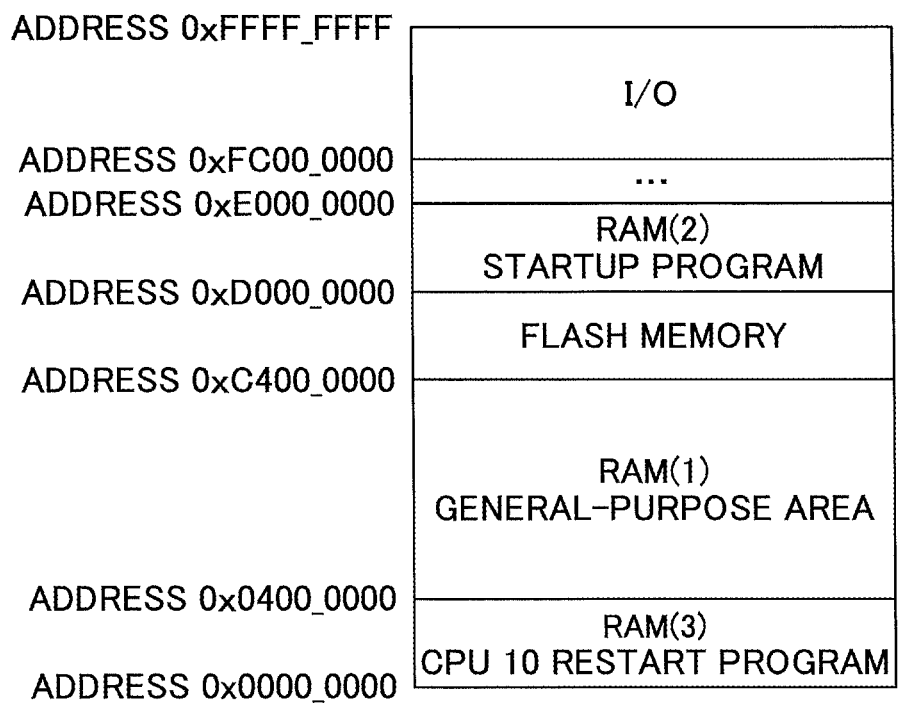
FIG. 8 illustrates a memory map in a state of an ordinary startup having been completed.

FIG. 8 illustrates a memory map in a state of an ordinary startup having been completed. The address conversion part 52 and the access distribution part 54 change the memory map into the state illustrated in FIG. 8, after step S121 in FIG. 6 has been carried out. Thus, as shown in FIG. 8, in the state of the ordinary startup having been completed, the RAM(3) is associated with the memory area that starts from the address zero. The RAM(3) stores the CPU 10 restart program which has the contents different from the startup programs for an ordinary startup including the boot program, the CPU 10 startup program and the CPU 12 startup program (indicated by "*" in FIG. 4).

When a restart is carried out in the state shown in FIG. 8, the CPU 10 issues a read instruction designating the address zero in the same way as an ordinary startup. When the CPU 10 has issued the read instruction designating the address zero, the address conversion part 52 and the access distribution part 54 convert it into a read instruction designating the beginning address of the RAM(3), and send it to the RAM 32.

As a result, when carrying out a restart, the CPU 10 executes the CPU 10 restart program stored in the RAM(3) instead of the startup programs ("*") provided for an ordinary startup stored in the flash memory 42 and the RAM(2).

For example, the CPU 10 restart program is one obtained from excluding the boot program and the CPU 12 startup program from the startup programs ("*") provided for an ordinary startup. Therefore, the number of instructions included in the CPU 10 restart program is smaller than that of the startup programs ("*") provided for an ordinary startup, and thus, it is possible to complete execution of the CPU 10 restart program at high speed.

Figure 9:
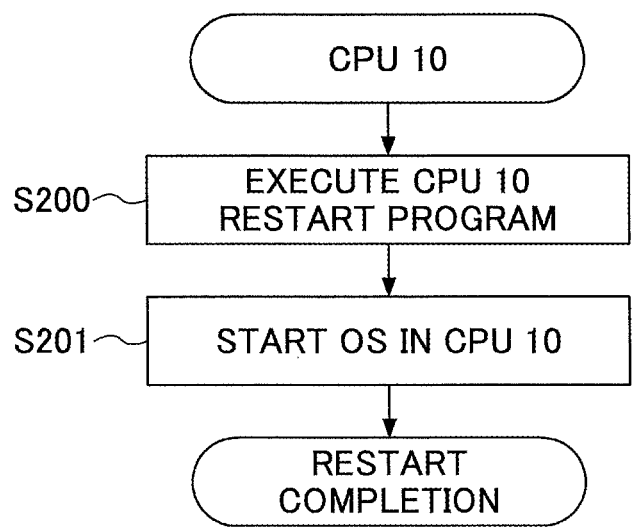
FIG. 9 is a flowchart showing a flow of processes carried out by the CPU 10 at a time of a restart.

FIG. 9 shows one example of a flowchart showing a flow of processes to be carried out by the CPU 10 at a time of a restart.

First, the CPU 10 executes the CPU 10 restart program stored in the RAM(3) (step S200).

Then, the CPU 10 starts the OS in the CPU 10, (step S201), and completes the restart.

Summary of First Embodiment

Usually, when a master processor such as the CPU 10 carries out resetting hardware, a setting is automatically made such that instructions are executed from a fixed address such as the address zero. Therefore, it is not possible for a master processor to execute a startup program different from one provided for an ordinary startup.

In contrast thereto, according to the information processing apparatus 1 in the first embodiment, the address conversion part 52 and the access distribution part 54 change an issuance target of a read instruction at a time of a restart. Therefore, the CPU 10 can execute the startup program (restart program) at a time of a restart different from the startup programs that the CPU 10 carries out at a time of an ordinary startup that is carried out at a time of ordinarily starting the power supply. As a result, in the information processing apparatus 1, it is possible to reduce the startup time at a time of a restart, i.e., at a time of a predetermined startup.

Further, according to the information processing apparatus 1, the hardware including the address conversion part 52 and the access distribution part 54 thus realizes switching of the startup program(s). Therefore, in comparison to a case of carrying out such a restart through software processing, it is possible to reduce a load required to modify the software.

Second Embodiment

Below, an information processing apparatus 2 according to a second embodiment will be described. The <Configuration> is the same as the above-described first embodiment, and thus, duplicate description will be omitted. It is to be noted that, in the second embodiment, an already started flag storage part 52A is not indispensable.

<Operations at Time of Starting Power Supply>

Figure 10:
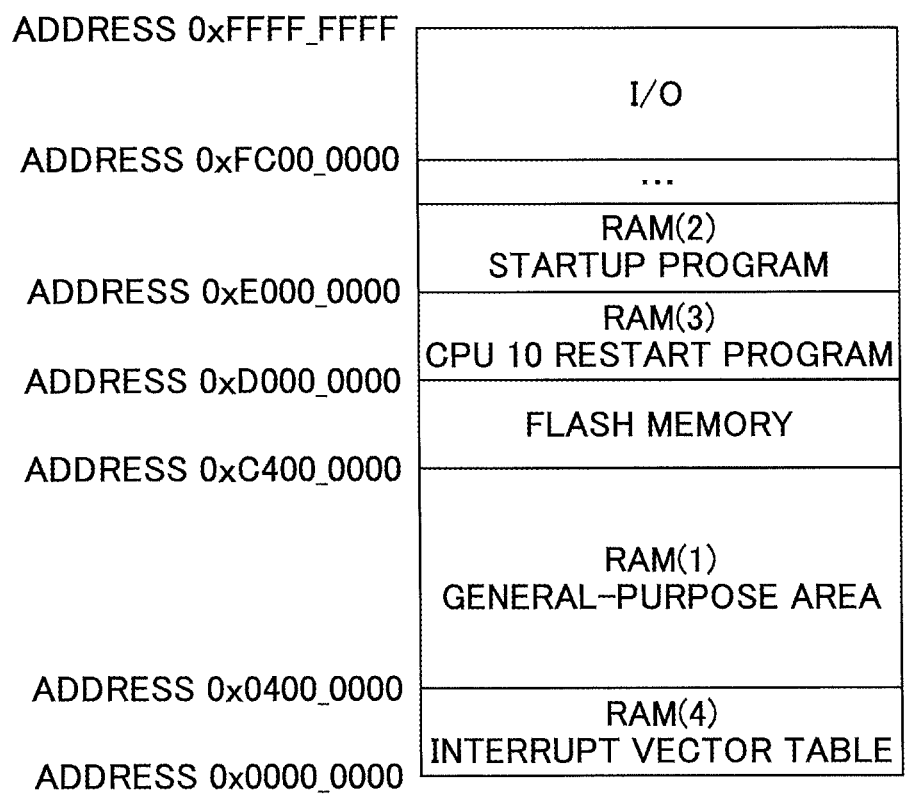
FIG. 10 shows a memory map in an information processing apparatus according to a second embodiment after an ordinary startup.

In the information processing apparatus 2, the state of the memory map is changed from the state shown in FIG. 4 into the state shown in FIG. 5 at a time of starting the power supply. After an ordinary startup has been thus completed, the memory area that starts from the address zero is associated with an area storing an interrupt vector table (RAM(4)). FIG. 10 illustrates the memory map after an ordinary startup in the information processing apparatus 2.

By thus creating the memory map, it is possible that the address zero is automatically referred to when an interrupt notification has been carried out. Thus, it is possible to improve the efficiency of the processing.

Figure 11:
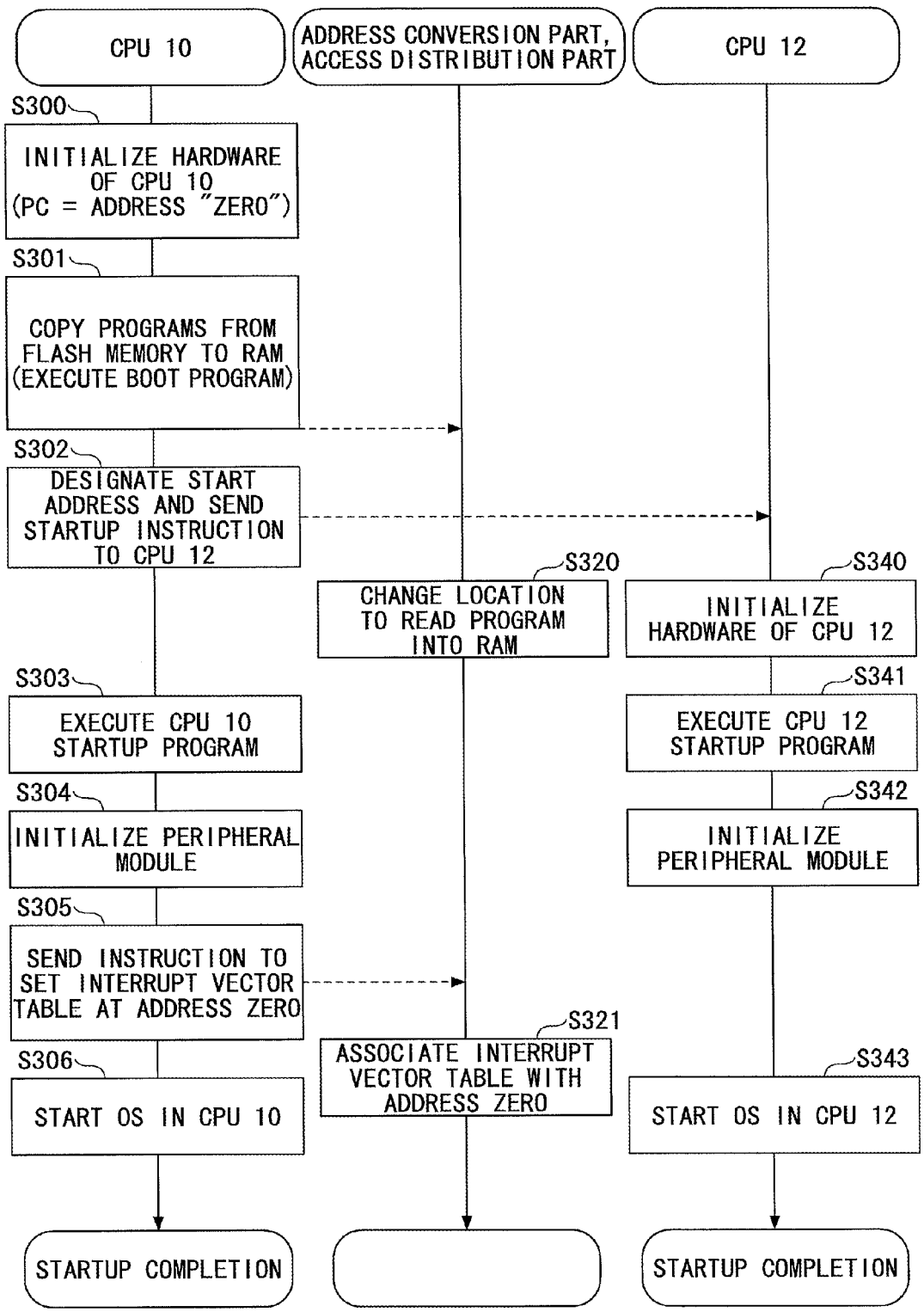
FIG. 11 is a flowchart showing a flow of processes carried out by a CPU 10, an address conversion part, an access distribution part and a CPU 12 according to the second embodiment at a time of an ordinary startup.

FIG. 11 is a flowchart showing one example of a flow of processes carried out by a CPU 10, the address conversion part 52, an access distribution part 54 and a CPU 12 according to the second embodiment at a time of an ordinary startup. It is noted that, in the flowchart shown in FIG. 11, the orders of steps carried out in parallel are not particularly limited. For example, step S340 may be carried out temporally after step S303.

First, the CPU 10 initializes the hardware of the CPU 10 (step S300). Specifically, the CPU 10 initializes the operating frequency and a cache capacity, and causes storage elements inside the CPU 10 such as a program counter, a register and so forth to have their original states. Thereby, the program counter value is set to indicate, for example, the address zero.

Next, the CPU 10 executes the boot program stored in the flash memory 42, and thereby, the CPU 10 startup program and the CPU 12 startup program are copied to the RAM 32 (in step S301, see FIGS. 4 and 5). After the execution of the boot program is completed, a signal indicating this matter is transmitted to the address conversion part 52 and the access distribution part 54.

Next, the CPU 10 designates a start address and sends a startup instruction to the CPU 12 (step S302). For example, the start address is an address in the RAM 32 at which the CPU 12 startup program has been copied (i.e., the beginning address of the area that stores the CPU 12 startup program in the RAM(2) area shown in FIG. 5).

Next, the address conversion part 52 and the access distribution part 54 change a reading target, from which the CPU 10 reads the program, to an address in the RAM 32 (i.e., the beginning address of the area that stores the CPU 10 startup program in the RAM(2) area shown in FIG. 5) (step S320).

Next, the CPU 12 initializes the hardware of the CPU 12 (step S340).

Then, the CPU 10 executes the CPU 10 startup program stored in the RAM 32 (step S303), and the CPU 12 executes the CPU 12 startup program stored in the RAM 32 (step S341). The respective programs include, for example, instructions for starting Basic Input/Output Systems (BIOSs).

Next, the CPU 10 and the CPU 12 initialize a peripheral module 20 (step S304 and S342). The peripheral module 20 includes a timer(s), a debugger(s) and so forth, and the respective CPUs 10 and 12 cause the internal states thereof to be the original states.

Next, the CPU 10 sends an instruction to the address conversion part 52 to set the interrupt vector table at the address zero (step S305). The address conversion part 52 responds to the instruction and associates the interrupt vector table with the address zero (step S321).

Next, the CPU 10 and the CPU 12 start the respective OSs (steps S306 and S343), and thus, the ordinary startup is completed. It is noted that the OSs are stored, for example, in the RAM(1) shown in FIGS. 4 and 5.

[Operations at Time of Restart]

In the information processing apparatus 2, the CPU 12 monitors to determine whether a restart factor has occurred in the CPU 10. A restart factor in the CPU 10 may be detected by the CPU 12 as a result of a restart factor occurrence notification being sent to the CPU 12 from the CPU 10, or a restart factor in the CPU 10 may be detected by the CPU 12 as a result of the CPU 12 monitoring various states of the CPU 10.

Figure 12:
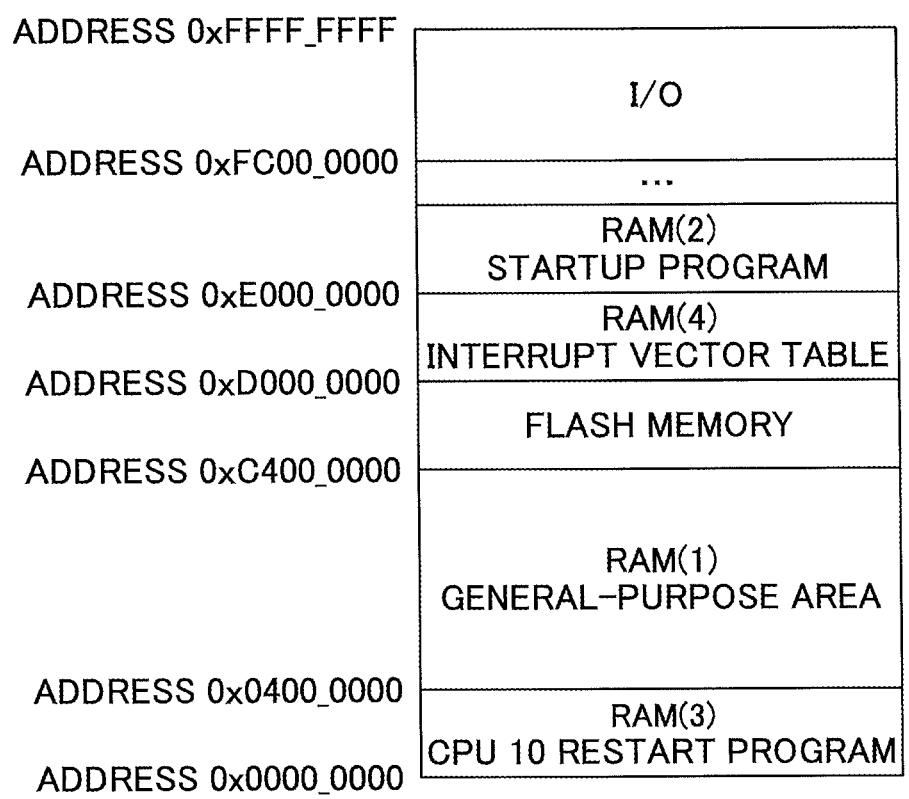
FIG. 12 illustrates a memory map after a restart factor having occurred in the CPU 10 has been notified in the information processing apparatus according to the second embodiment.

When a restart factor has occurred in the CPU 10, the CPU 12 notifies the restart determination part 52B of the address conversion part 52 of this matter. The restart determination part 52B of the address conversion part 52 that has received the notification rewrites the offset value table 52C so as to associate the CPU 10 restart program with the address zero. FIG. 12 illustrates the memory map after a restart factor having occurred in the CPU 10 has been notified in the information processing apparatus 2.

Figure 13:
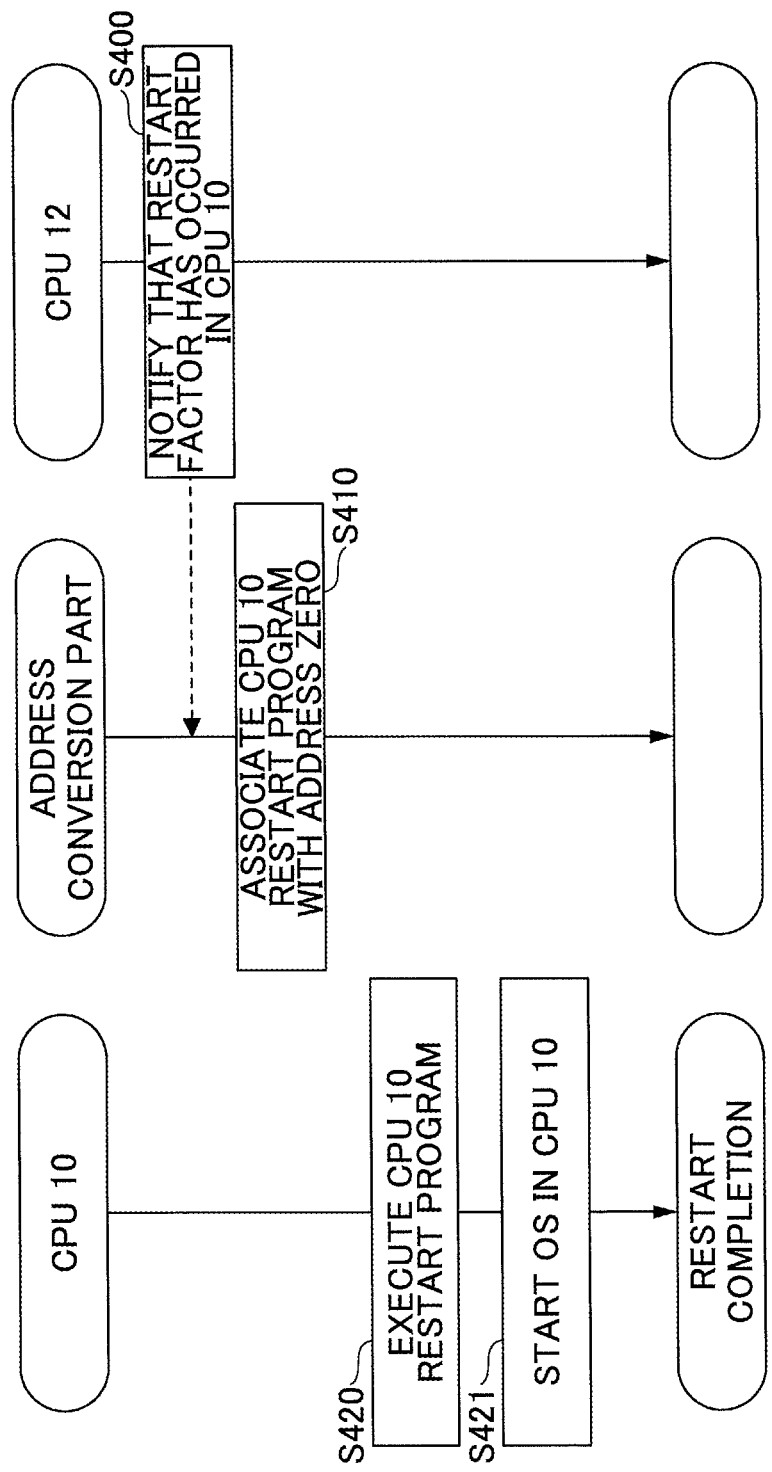
FIG. 13 is a flowchart showing a flow of processes carried out by the CPU 10, the address conversion part, the access distribution part and the CPU 12 according to the second embodiment at a time of a restart.

FIG. 13 is one example of a flowchart showing a flow of processes executed by the CPU 10, the address conversion part 52 and the CPU 12 according to the second embodiment at a time of a restart. Execution of the flowchart is started at a timing of the CPU 12 having detected in some way that a restart factor has occurred in the CPU 10.

First, the CPU 12 notifies the address conversion part 52 that a restart factor has occurred in the CPU 10 (step S400).

The address conversion part 52 that has received the notification rewrites the offset value table 52C so as to associate the CPU 10 restart program with the address zero (step S410).

Next, the CPU 10 executes the CPU 10 restart program stored in the RAM(3) (step S420). It is noted that, in order to ensure that step S420 is carried out after the completion of step S410, a certain amount of waiting time may be provided, for example.

Then, the CPU 10 starts the OS in the CPU 10 (step S421), and thus completes the restart.

Summary of Second Embodiment

According to the information processing apparatus 2 in the second embodiment, the address conversion part 52 and the access distribution part 54 change an issuance target of a read instruction at a time of a restart, in a way similar to the way of the information processing apparatus 1 according to the first embodiment. Therefore, the CPU 10 can execute the startup program (restart program) at a time of a restart different from the startup programs that the CPU 10 carries out at a time of an ordinary startup that is carried out at a time of ordinarily starting the power supply. As a result, also in the information processing apparatus 2, it is possible to reduce the startup time at a time of a restart, i.e., at a time of a predetermined startup.

Further, also according to the information processing apparatus 2, hardware including the address conversion part 52 and the access distribution part 54 realizes switching of the startup program(s). Therefore, in comparison to a case of carrying out such a restart through software processing, it is possible to reduce a load required to modify the software.

Furthermore, according to the second embodiment, the area that starts from the address zero is associated with the interrupt vector table during a period of time from an ordinary startup to a restart. Thus, it is possible to efficiently carry out an interrupt process that is carried out when an interrupt notification has been carried out.

Third Embodiment

Below, an information processing apparatus 3 according to a third embodiment will be described.

Figure 14:
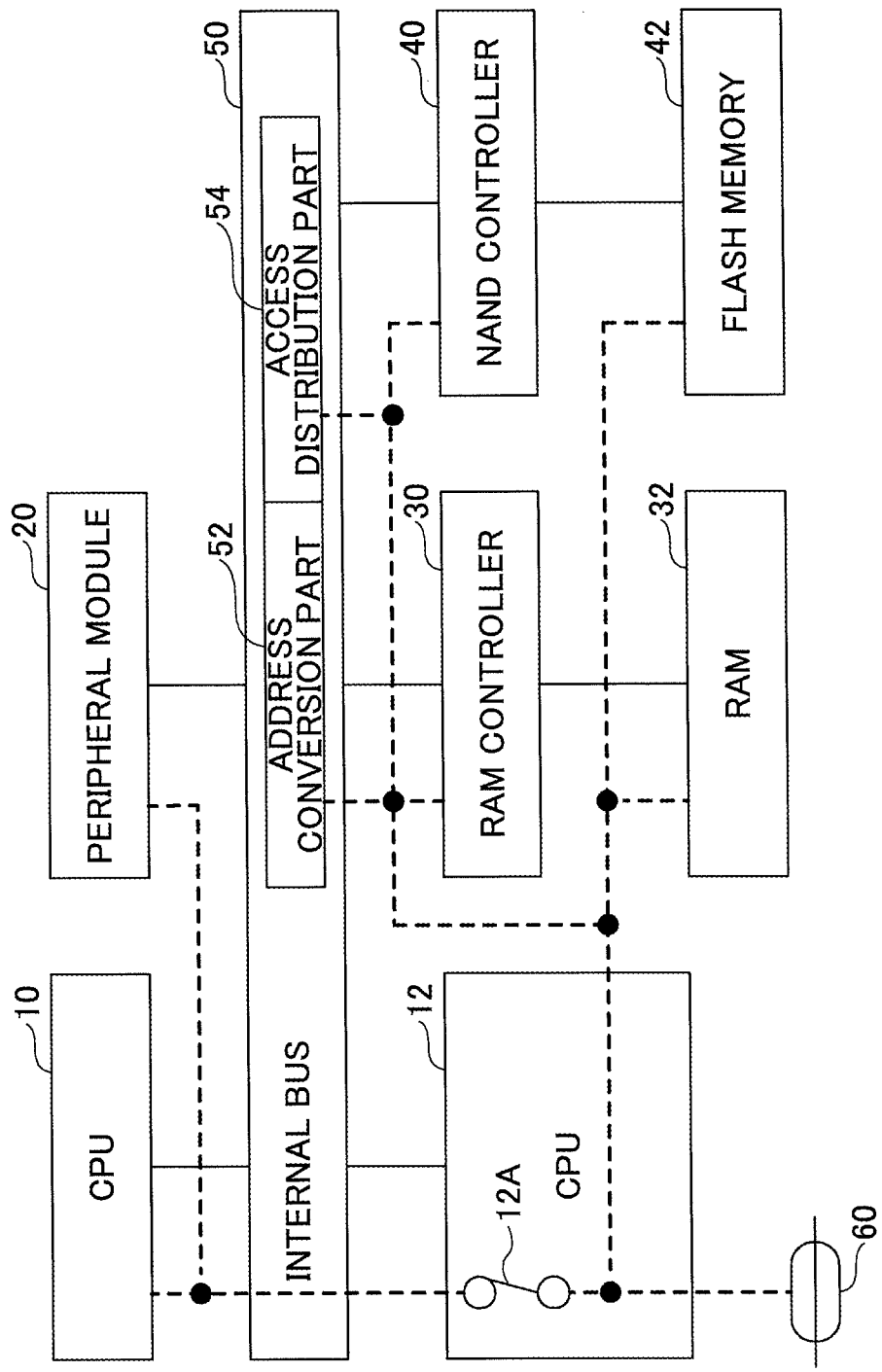
FIG. 14 shows a hardware configuration example of an information processing apparatus according to a third embodiment.
Figure 15:
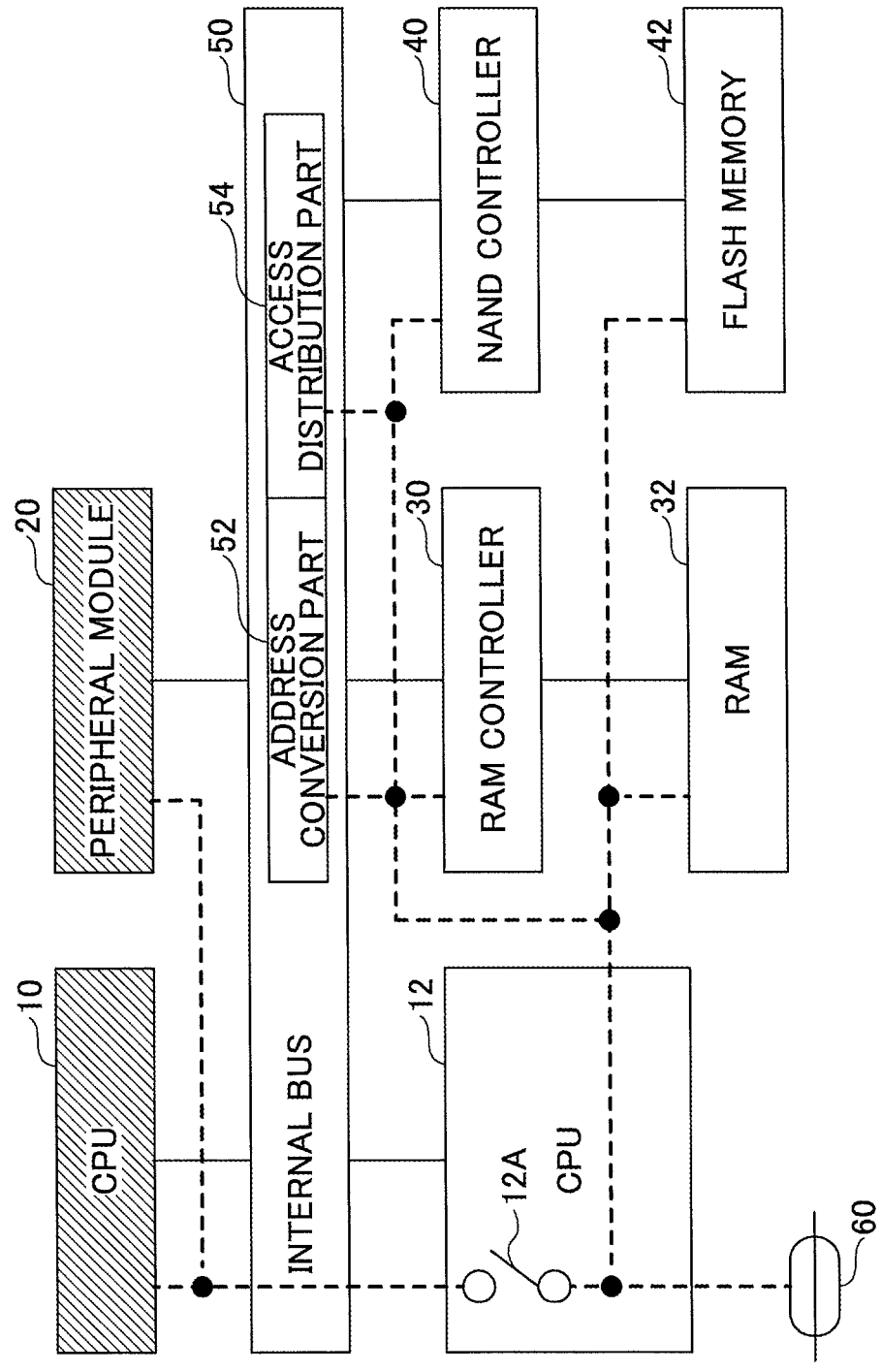
FIG. 15 illustrates, by hatching, devices for which the power supply is not carried out during a power saving mode according to the third embodiment.

FIG. 14 shows a hardware configuration of the information processing apparatus 3. Broken lines in FIG. 14 show power supply paths from a power source 60 such as a Power-Supply Unit (PSU). In the information processing apparatus 3 according to the third embodiment, a switch 12A is provided inside the CPU 12, for example. Thereby, the power saving mode of turning off the power supply to the CPU 10 and the peripheral module 20 can be carried out. FIG. 15 illustrates the devices, by hatching, for which the power supply is not carried out during the power saving mode. However, FIG. 15 shows merely one example. It is possible that also, for example, the power supply to the flash memory 42 is turned off when the information processing apparatus 3 enters the power saving mode. When the information processing apparatus 3 enters the power saving mode, the power supply to the CPU 10 is turned off in a state of, for example, the control states and/or the like having been stored in the RAM 32. On the other hand, the power supply to the address conversion part 52 and the access distribution part 54 is maintained even during the power saving mode.

The specific contents of the power saving mode are not limited to the above-mentioned example. Instead of the above-mentioned example, various configuration examples may be employed. For example, it is possible that, while the power supply to the CPU 10 is maintained, only the supply of the clock signal(s) to the CPU 10 is turned off when the information processing apparatus 3 enters the power saving mode.

The information processing apparatus 3 enters the power saving mode (the power saving mode is started in the information processing apparatus 3) when a user has operated a specific switch; when a state of no operation being performed on an input operation part and also no operation request being sent from another computer(s) has continued for a predetermined period of time; or the like, for example. For example, the CPU 10 monitors to determine whether such a condition has been satisfied. When the information processing apparatus 3 is to enter the power saving mode, a notification is sent from the CPU 10 to the CPU 12. On the other hand, the information processing apparatus 3 exits (returns) from the power saving mode when a user has again operated the specific switch; when a predetermined returning time has come; when an operation request has been sent from another computer; or the like ("returning factors"), for example.

The CPU 10 in the information processing apparatus 3 according to the third embodiment executes the CPU 10 restart program when the information processing apparatus 3 returns from the power saving mode. At this time, since the power supply to the address conversion part 52 and the access distribution part 54 is maintained even during the power saving mode, the memory map illustrated in FIG. 8 or FIG. 12, for example, is maintained even during the power saving mode. As a result, when the information processing apparatus 3 returns from the power saving mode, the CPU 10 can immediately execute the CPU 10 restart program. As a result, it is possible to reduce not only the startup time required at a time of the CPU 10 carrying out a restart but also the startup time concerning a restart carried out at a time of returning from the power saving mode.

Figure 16:
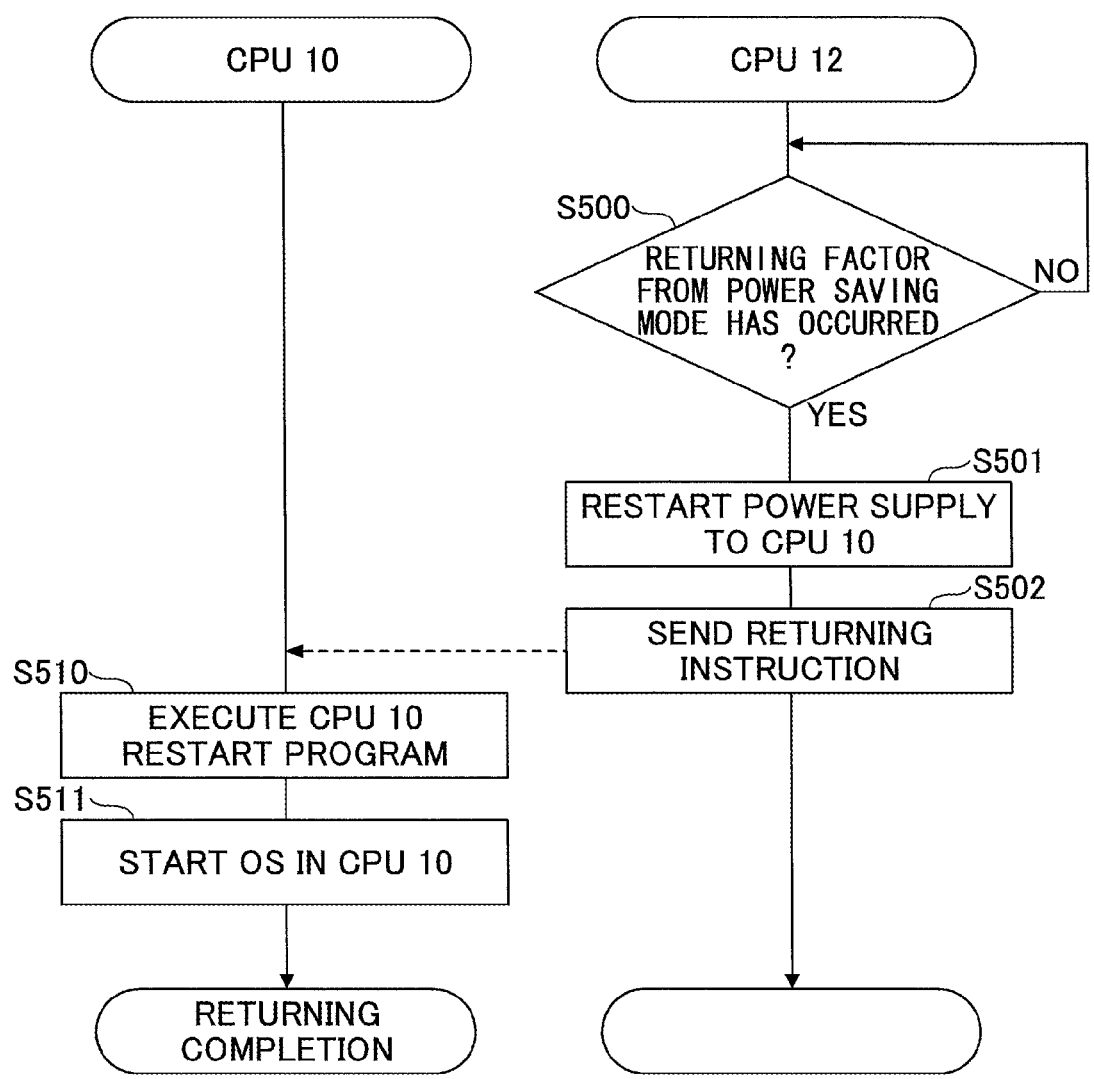
FIG. 16 is a flowchart showing a flow of processes carried out by a CPU 10 and a CPU 12 according to the third embodiment.

(1) In the third embodiment, when the interrupt vector table is not set at the address zero, the CPU 10 restart program may be associated with the address zero (see FIG. 6) after the completion of an ordinary startup as in the first embodiment. FIG. 16 is one example of a flowchart showing a flow of processes carried out by the CPU 10 and the CPU 12 according to the third embodiment. The execution of the flowchart shown in FIG. 16 is started at a timing of the information processing apparatus 3 having entered the power saving mode.

First, the CPU 12 waits for a returning factor from the power saving mode to occur (step S500).

When a returning factor from the power saving mode has occurred, the CPU 12 restarts the power supply to the CPU 10

(step S501), and sends a returning instruction such as an interrupt notification to the CPU 10 (step S502).

The CPU 10 executes the CPU 10 restart program stored in the RAM(3) (step S510). Since the memory map, for example, illustrated in FIG. 8, has been maintained, the CPU 10 can immediately execute the CPU 10 restart program.

Then, the CPU 10 starts the OS in the CPU (step S511), and completes returning from the power saving mode.

(2) On the other hand, in the third embodiment, in a case where the interrupt vector table is set at the address zero, when the information processing apparatus 3 has entered the power saving mode, this matter may be notified to the restart determination part 52B of the address conversion part 52. In this case, the restart determination part 52B of the address conversion part 52 that has received the notification rewrites the offset value table 53C so as to associate the CPU restart program with the address zero.

Figure 17:
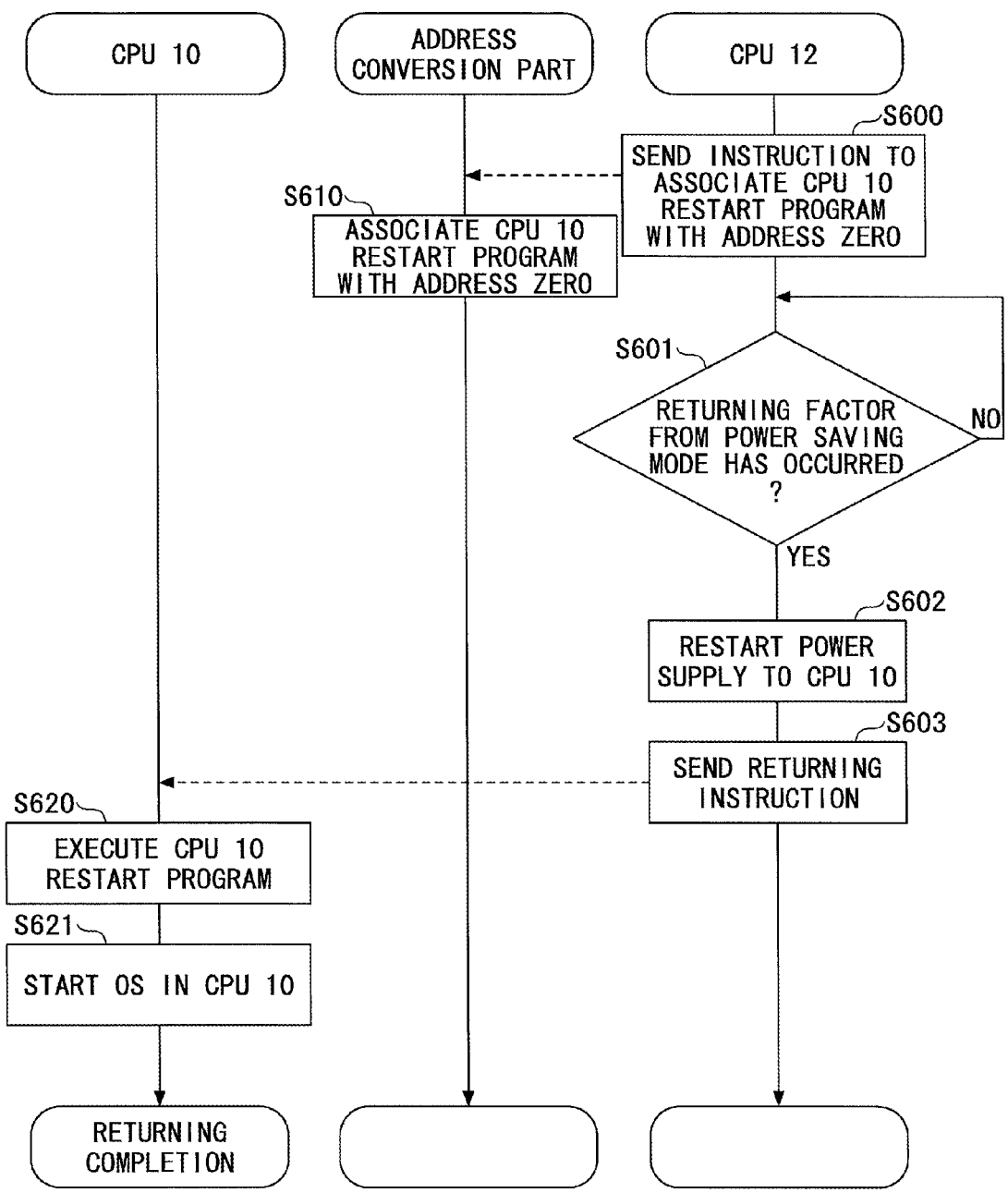
FIG. 17 is a flowchart in another example showing a flow of processes carried out by the CPU 10 and the CPU 12 according to the third embodiment.

FIG. 17 is another example of a flowchart showing a flow of processes carried out by the CPU 10, the address conversion part 52 and the CPU 12 according to the third embodiment. The execution of the flowchart shown in FIG. 17 is started at a timing of the information processing apparatus 3 having entered the power saving mode.

First, the CPU 12 sends an instruction to the address conversion part 52 to cause the address conversion part 52 to associate the CPU 10 restart program with the address zero (step S600).

The address conversion part 52 that has received the instruction rewrites the offset value table 52C so as to associate the CPU 10 restart program with the address zero (step S610). As a result, the memory map is changed from the state illustrated in FIG. 10 to the state illustrated in FIG. 12, for example.

Next, the CPU 12 waits for a returning factor from the power saving mode to occur (step S601).

When a returning factor from the power saving mode has occurred, the CPU 12 restarts the power supply to the CPU 10 (step S602), and sends a returning instruction such as an interrupt notification to the CPU 10 (step S603).

The CPU 10 executes the CPU 10 restart program stored in the RAM(3) (step S620). Since the memory map, for example, illustrated in FIG. 12, has been maintained, the CPU 10 can immediately execute the CPU 10 restart program.

Then, the CPU 10 starts the OS in the CPU (step S621), and completes returning from the power saving mode.

Summary of Third Embodiment

According to the information processing apparatus 3 in the third embodiment, the address conversion part 52 and the access distribution part 54 change a issuance target of a read instruction at a time of returning from the power saving mode. Therefore, the CPU 10 can execute the startup program (restart program) at a time of returning from the power saving mode different from the startup programs that the CPU 10 carries out at a time of an ordinary startup that is carried out at a time of ordinarily starting the power supply. As a result, also in the information processing apparatus 3, it is possible to reduce the startup time at a time of returning from the power saving mode, i.e., at a time of a predetermined startup.

Further, also according to the information processing apparatus 3, hardware including the address conversion part 52 and the access distribution part 54 realizes switching of the startup program(s). Therefore, in comparison to a case of carrying out such a restart through software processing, it is possible to reduce a load required to modify the software.

Further, the information processing apparatus 3 may carry out the CPU 10 restart program also at a time of a restart, in addition to a time of returning from the power saving mode. In this case, in the information processing apparatus 3, it is possible to reduce the startup time at a time of returning from the power saving mode and the startup time at a time of a restart.

It is to be noted that the CPU 10 in the respective embodiments is one example of a processor, and the CPU 12 is one example of an other processor.

The information processing apparatuses according to the respective embodiments can be applied to various apparatuses in which the information processing apparatuses will be mounted, respectively. For example, it is possible to apply the information processing apparatuses to printers such as MultiFunction Peripherals (MFPs), projectors, TV conference systems, control systems mounted in movable bodies, machine tool systems, personal computers, and so forth, respectively.

Summary of Embodiments

Thus, according to the embodiments described above, it is possible to provide the information processing apparatuses in each of which it is possible to reduce the startup time required when a predetermined startup different from an ordinary startup is carried out.

<Variants and So Forth>

Although the information processing apparatuses according to the embodiments have been described above, the present invention is not limited to these specifically disclosed embodiments, and variations and modifications may be made without departing from the scope of the present invention.

Figure 18:
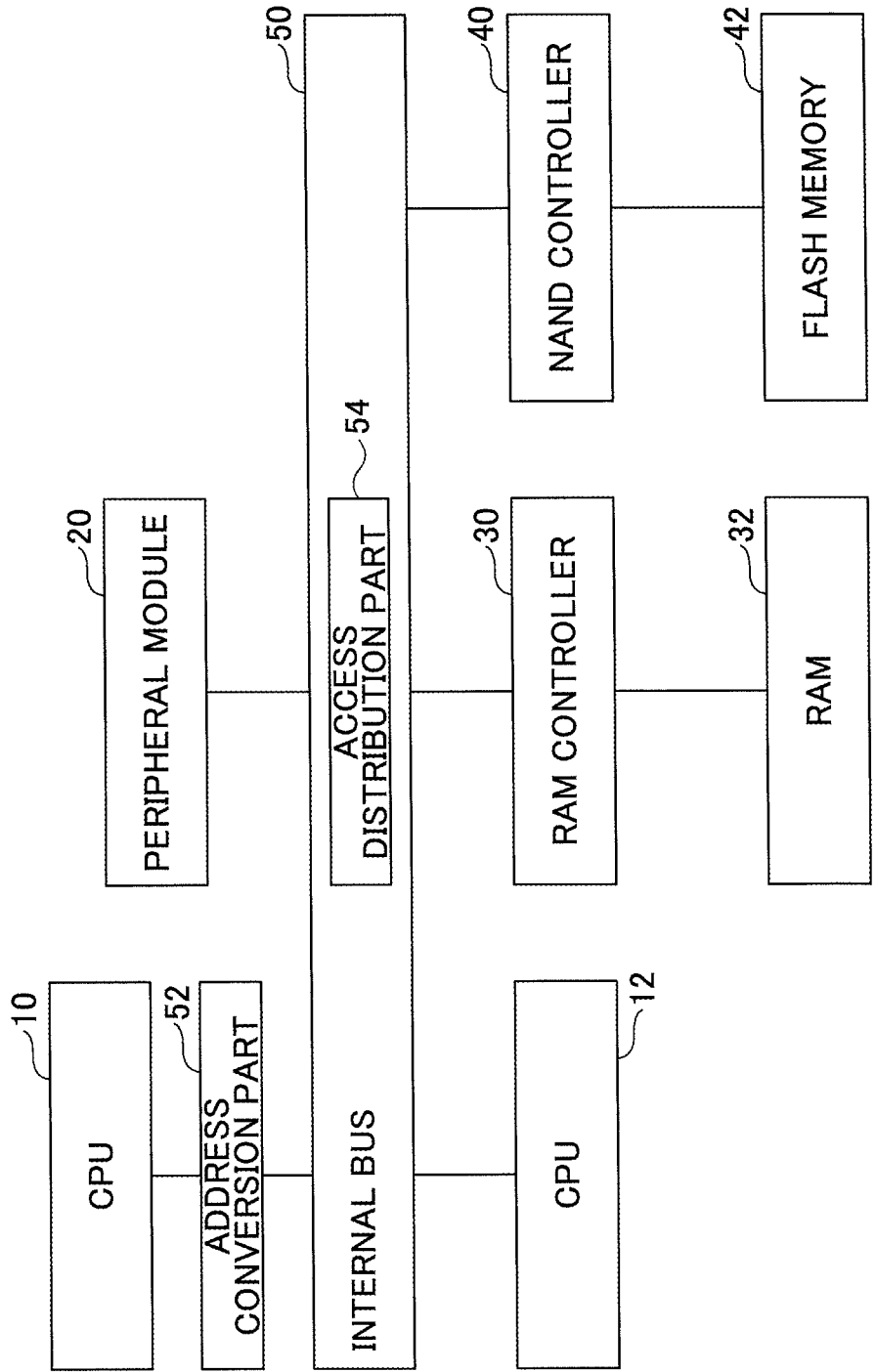
FIG. 18 shows another configuration example of an information processing apparatus.

For example, in the respective embodiments, the internal bus 50 includes the address conversion parts 52 and the access distribution parts 54 (for example, at predetermined relay places), respectively. However, instead, the address conversion part 52 may be mounted at a place of connecting the CPU 10 and the internal bus 50 (or may be mounted inside the CPU 10). FIG. 18 shows another configuration example of an information processing apparatus, and shows a state of the address conversion part 52 and the access distribution part 54 being mounted at a place of connecting the CPU 10 and the internal bus 50 (or may be mounted inside the CPU 10), and inside the internal bus 50, respectively.

Further, in each of the respective embodiments, the information processing apparatus includes the plurality of the CPUs 10 and 12, i.e., the processors. However, the information processing apparatus may have a configuration that includes a single processor. In this case, startup programs provided for an ordinary startup do not include the startup program for a slave processor(s) such as the CPU 12, and the CPU 10 restart program is one obtained from excluding the boot program, the instructions concerning initialization of the peripheral module and so forth from the startup programs provided for an ordinary startup.

The present patent application is based on and claims the benefit of priority of Japanese Priority Application No. 2012-201142 filed on Sep. 13, 2012, the entire contents of which are hereby incorporated herein by reference.

What is claimed is:

1. An information processing apparatus comprising:
  a first processor configured to executes an instruction stored in a fixed address area in a storage part;
  a second processor that, at a time of a startup, executes an instruction stored in an address area designated by the first processor in the storage part;

the storage part, the storage part storing a first startup program and a second startup program, contents of the second startup program being different at least partially from those of the first startup program; and an address conversion part configured such that, when the first processor performs a first startup different from an ordinary startup that is performed at a time of starting power supply to the information processing apparatus, the address conversion part converts an address included in a read instruction issued by the first processor indicating a first storage area that stores the first startup program into an address indicating a second storage area that is different from the first storage area and stores the second startup program, and sends the converted address to the storage part, wherein the first startup program includes an instruction for performing startup control of the second processor, and the second startup program does not include an instruction for performing startup control of the second processor.

2. The information processing apparatus as claimed in claim 1, wherein the information processing apparatus is configured such that the storage part includes a non-volatile memory and a RAM, when the ordinary startup is to be performed, the first startup program and the second startup program are stored in the non-volatile memory, before the first startup is performed, the second startup program is copied to the RAM, when the first processor performs the first startup, the address conversion part converts the address included in the read instruction issued by the first processor indicating the storage area that stores the first startup program into the address indicating the second storage area in the RAM that stores the second startup program, and sends the converted address to the RAM.

3. The information processing apparatus as claimed in claim 1, wherein the address conversion part is configured such that after the ordinary startup has been performed, the address conversion part changes its own state into a state of converting the address included in the read instruction issued by the first processor indicating the storage area that stores the first startup program into the address indicating the second storage area that stores the second startup program, and sends the converted address to the storage part.

4. The information processing apparatus as claimed in claim 1, wherein the address conversion part is configured such that after the ordinary startup has been carried out, the address conversion part changes a memory map that has been used for the ordinary startup into another memory map for converting the address included in the read instruction issued by the first processor indicating the storage area that stores the first startup program into the address indicating the second storage area that stores the second startup program.

5. The information processing apparatus as claimed in claim 1, wherein the address conversion part is configured such that after the first processor has carried out the ordinary startup, the address conversion part changes its state into a state of associating an area that stores a program concerning an interrupt process with the fixed address area, and when the second processor has notified that the first processor is to carry out the first startup, the address conversion part changes its own state into a state of converting the address included in the read instruction issued by the first processor indicating the storage area that stores the first startup program into the address indicating the second storage area that stores the second startup program, and sending the converted address to the storage part.

6. The information processing apparatus as claimed in claim 1, wherein the address conversion part is configured such that after the first processor has carried out the ordinary startup, the address conversion part changes a memory map that has been used for the ordinary startup into an other memory map for associating an area that stores a program concerning an interrupt process with the fixed address area, and when the second processor has notified that the first processor is to carry out the first startup, the address conversion part changes the other memory map further into another memory map for converting the address included in the read instruction issued by the first processor indicating the storage area that stores the first startup program into the address indicating the second storage area that stores the second startup program.

7. The information processing apparatus as claimed in claim 1, wherein the address conversion part is mounted in a predetermined relay place on a bus that connects the first processor and the second processor with the storage part.

8. The information processing apparatus as claimed in claim 1, wherein the address conversion part is mounted on a communication path that branches off for the first processor from a bus that connects the first processor and the second processor with the storage part.

9. The information processing apparatus as claimed in claim 1, wherein the information processing apparatus is configured to implement a function of entering a power saving mode of reducing power consumption of the first processor, the second processor is configured to monitors a returning factor from the power saving mode, and the information processing apparatus is configured such that power supply to the address conversion part is maintained during the power saving mode.

* * * * *